April 24, 1951     E. A. LEIDING ET AL     2,550,275
FISHING LINE DRIER
Filed Dec. 3, 1945     2 Sheets-Sheet 1
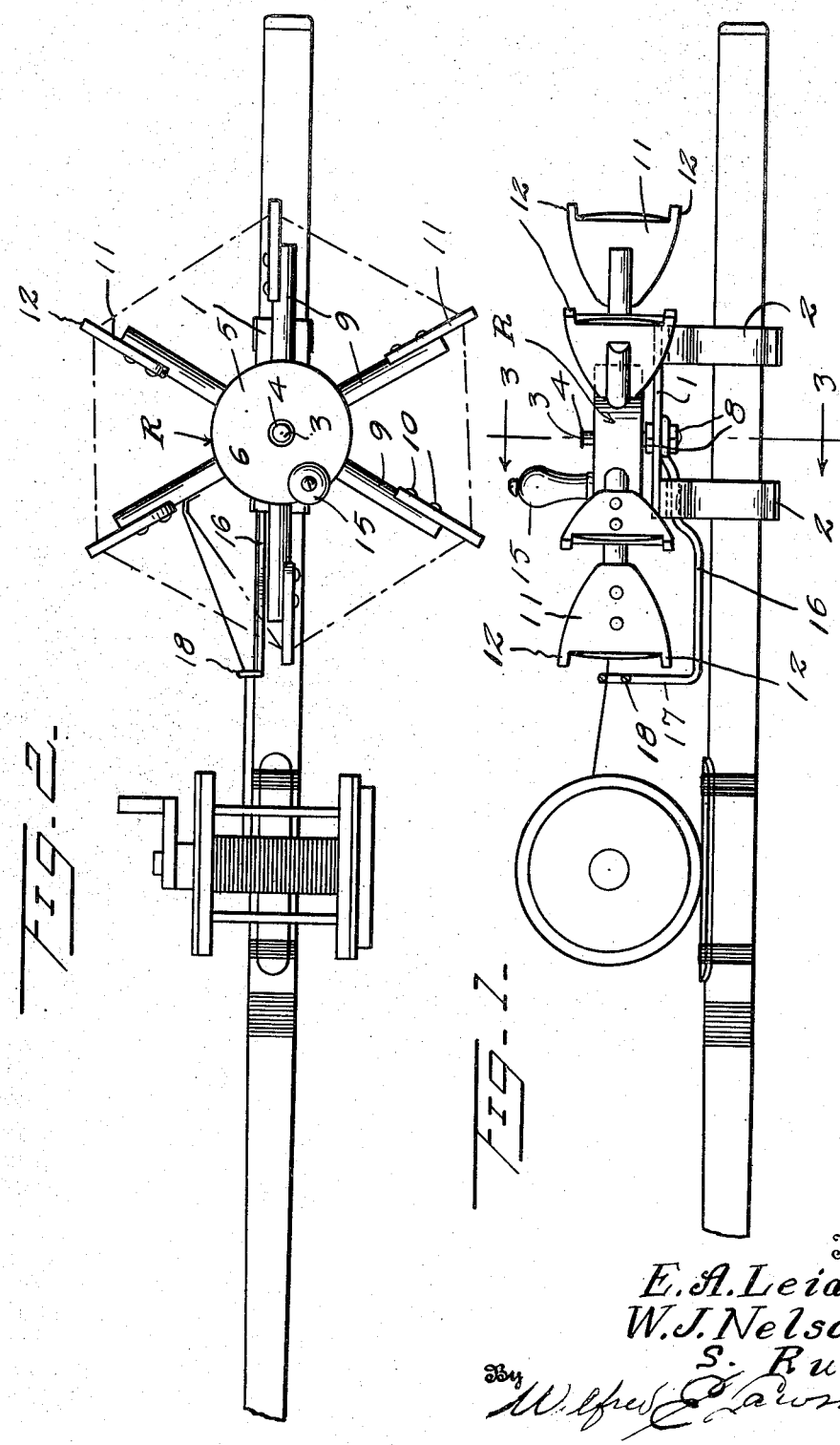
Inventors
E. A. Leiding
W. J. Nelson
S. Rutka
By Wilfred E. Lawson
Attorney

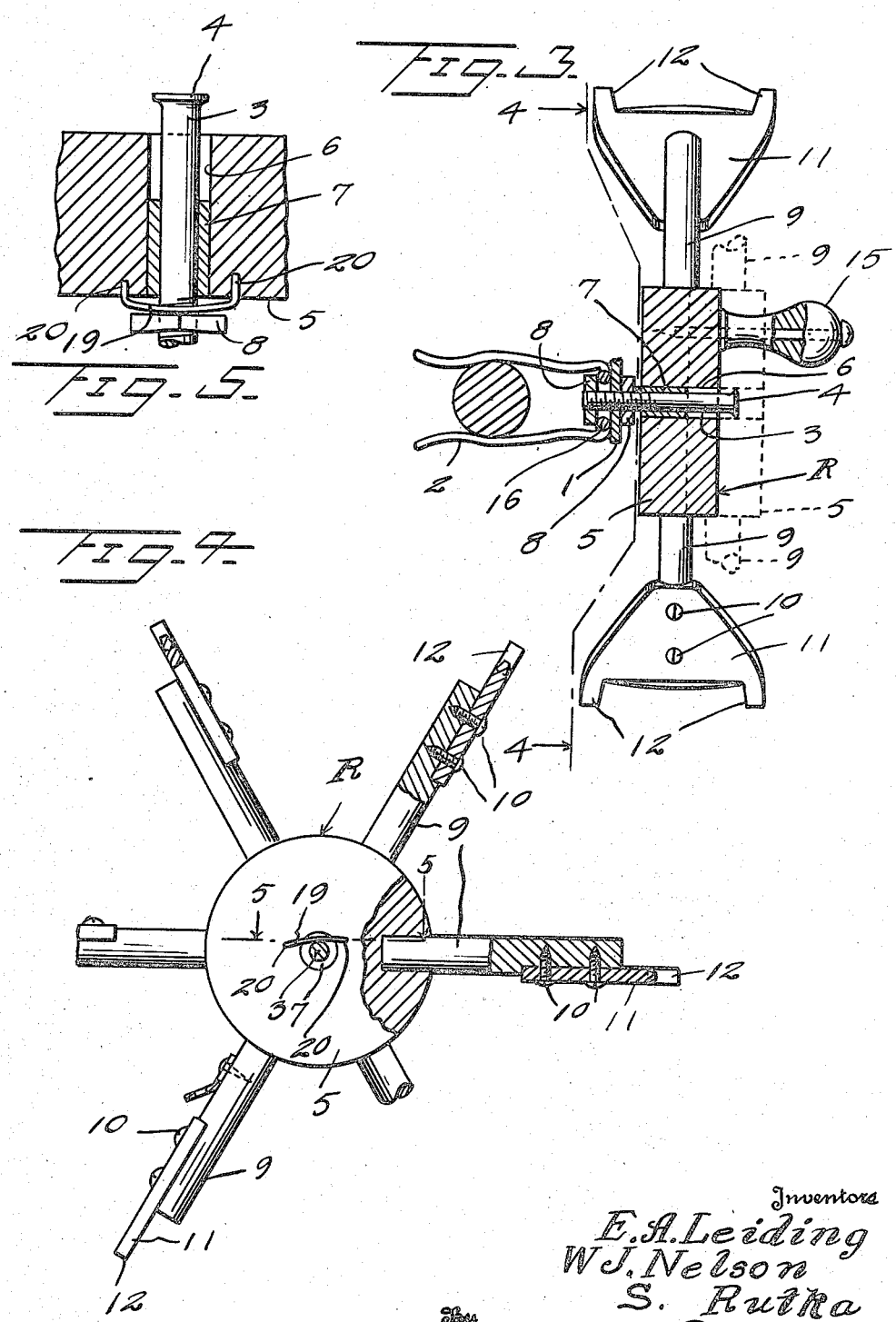

Patented Apr. 24, 1951

2,550,275

UNITED STATES PATENT OFFICE 2,550,275

FISHING LINE DRIER

Elmer A. Leiding, William J. Nelson, and Stanley Rutka, Orr, Minn.

Application December 3, 1945, Serial No. 632,482

5 Claims. (Cl. 242—104)

This invention relates to a fishing line drier and it is primarily an object of the invention to provide a device of this kind which can be readily applied to a rod butt and in a position to assure a ready and effective winding of the line on the drier.

Another object of the invention is to provide a device of this kind including a winding reel, together with a member for holding said reel to a rod butt or kindred support and wherein such member is provided with a guiding means for the line.

It is also an object of the invention to provide a device of this kind which requires no assembling before use by the fisherman and which is of a type to permit the reel of the device to lie flat against the rod below the fishing reel and wherein the holding means is such to allow the drier to be readily snapped on or off relative to the rod butt.

An additional object of the invention is to provide a drier for a fishing line which includes a reel and a supporting axle therefor and wherein the reel has limited sliding movement lengthwise of the axle to facilitate effective spreading of the line on the reel to facilitate the drying of the line.

The invention consists in the details of construction and in the combinaton and arrangement of the several parts of our improved fishing line drier whereby certain important advantages are attained, as will be hereinafter more fully set forth.

In order that our invention may be better understood, we will now proceed to describe the same with reference to the accompanying drawings, wherein:

Figure 1 is a view in side elevation of a drier constructed in accordance with an embodiment of our invention and in applied position;

Figure 2 is a view in top plan of the assembly as illustrated in Figure 1;

Figure 3 is an enlarged sectional view taken substantially on the line 3—3 of Figure 1;

Figure 4 is a fragmentary sectional view taken substantially on the line 4—4 of Figure 3; and Figure 5 is an enlarged detail sectional view taken substantially on the line 5—5 of Figure 4.

In the embodiment of the invention as illustrated in the accompanying drawings, 1 denotes an elongated plate of desired dimensions and which is provided at its opposite extremities with the transversely spaced spring clamping arms 2 so assembled and arranged as to allow the plate 1 to be readily snapped on or off the butt or other desired portion of a fishing rod.

Extending outwardly from the plate 1 in a direction opposite to that of the spring arms 2 is an elongated axle 3 having its outer extremity provided with a surrounding stop flange 4 whereby is limited the extent of outward movement of the reel R mounted on the axle 3 for free rotation.

The reel R comprises a central body or hub 5 having disposed axially therethrough an opening or bore 6 through which may be inserted the axle 3 and its surrounding flange 4. Tightly fitted within the inner portion of this opening or bore 6 is a bushing 7 which provides a stop for coaction with the flange 4 of the axle 3 to limit the extent of outward movement of the reel R along the axle 3.

As is clearly illustrated in the accompanying drawings, the axle 3 is detachably engaged with the member or plate 1 through the medium of the holding nuts 8, and it is believed to be obvious that the axle 3 will be operatively engaged through the opening or bore 6 of the reel before the axle 3 is secured to the member or plate 1.

Radiating from the periphery of the body or hub 5 of the reel R and at equidistantly spaced points therearound are the outstanding arms 9 herein disclosed as six in number which is preferred, and secured, as at 10, to the outer end portions of these arms 9 are the transversely enlarged heads or forks 11 arranged upon the outer margins of which the line to be dried is adapted to be wound upon rotation of the reel R in the requisite direction. Each of these heads or forks 11 at its opposite ends is provided with the outstanding but relatively short arms or lugs 12 between which the line is adapted to be engaged.

The body or head 5 has extending outwardly therefrom adjacent to its periphery a knob or handhold 15, whereby the reel may be readily and conveniently manually rotated.

While we do not wish to be understood as limiting ourselves to the parts of the drier being made of any particular material yet, in practice, we find it desirable to have the different parts cast from a suitable plastic in order to provide a device that will be light in weight, cheap to manufacture, non-rusting, and which will assure protection for the line.

It is believed to be readily apparent that by having the reel R capable of endwise movement within certain limitations on the axle 3, the desired effective winding of the line will be materially facilitated.

Clamped to the rear face of the plate 1 and extending outwardly beyond an end thereof is a rod 16 of a length to terminate slightly beyond the outer ends of the heads or forks 11. The outer extremity of this rod 16 is continued by a laterally disposed arm 17 terminating in a guide eye 18 positioned at substantially the center of the heads or forks 11 as they pass thereunder. This guide eye 18 is adapted to have the line threaded therethrough to assure effective guiding of the line with respect to the reel to facilitate the winding operation.

One side face, preferably the inner, of the hub 5 has secured thereto a spring member 19 which has its intermediate portion bearing against the adjacent extremity of the axle 3 whereby a braking action is provided to prevent the reel R rotating too freely when reeling the line back on casting or trolling the reel after drying. This braking means operates to substantially eliminate possible tangling of the line and provides tension on the line so the same will not be wound too loosely on the rod reel.

As illustrated in the accompanying drawings, this spring 19 constitutes a wire possessing sufficient inherent resiliency, with its extremities securely anchored, as at 20, at opposite sides of the opening or bore 6 of the body or hub 5 and at such locations to assure the intermediate portion of the spring 19 having desired contact with the axle 3.

From the foregoing description it is thought to be obvious that a fishing line drier constructed in accordance with our invention is particularly well adapted for use by reason of the convenience and facility with which it may be assembled and operated.

We claim:

1. A line drier comprising a support, an axle carried by the support, a reel including a hub having an axial bore through which said axle extends, the axle having a head at its outer end of a diameter to enter said bore, a bearing sleeve secured within said bore and extending from the end thereof nearest to the support through a portion of the length of the bore whereby the reel may be shifted axially outwardly from the support on the axle, such outward movement being limited by the engagement of the axle head with the outer end of the bearing sleeve.

2. A line drier of the character stated in claim 1, with means carried by the hub and frictionally engaging the axle to yieldingly maintain the reel in a position to which it is shifted lengthwise of the axle.

3. A line drier of the character stated in claim 1, with a spring member having two ends secured in the hub and the portion intermediate said ends extending across the adjacent end of the bearing sleeve and frictionally engaging the axle to yieldingly maintain the reel in a position of adjustment on the axle.

4. A line drier comprising a plate, means carried by the plate for effecting the attachment thereof to a support such as a pole, an axle having an end extended through the plate and carrying securing nuts positioned upon opposite sides of the plate, a line guide comprising an arm having a loop upon one end, said loop having said axle passing therethrough and lying between a securing nut and the plate, the opposite end of the loop having a laterally directed portion terminating in a guide eye, a reel having a hub rotatably mounted upon said axle, and friction drag means carried by the reel hub and engaging the axle.

5. A line drier of the character stated in claim 4, wherein the reel hub is adapted to have axial movement outwardly on the axle away from the plate for rotation in a position away from or adjacent to the plate.

ELMER A. LEIDING.
WILLIAM J. NELSON.
STANLEY RUTKA.

REFERENCES CITED

The following references are of record in the file of this patent:

UNITED STATES PATENTS

| Number | Name | Date |
|---|---|---|
| 1,082,637 | Julien | Dec. 30, 1913 |
| 1,444,154 | Jenks | Feb. 6, 1923 |
| 1,714,535 | Weiss | May 28, 1929 |

FOREIGN PATENTS

| Number | Country | Date |
|---|---|---|
| 13,156 | Great Britain | of 1906 |